United States Patent
Pelluru et al.

(10) Patent No.: US 12,394,032 B1
(45) Date of Patent: Aug. 19, 2025

(54) APPARATUS AND METHOD FOR RESCAN WORKFLOW MANAGEMENT IN AUTOMATED SCANNING SYSTEMS

(71) Applicant: Pramana, Inc., Cambridge, MA (US)

(72) Inventors: Pavani Pallavi Pelluru, Pocharam (IN); Viral Pandey, Cambridge, MA (US); Raghubansh Bahadur Gupta, Bangalore (IN); Ramanjaneya Reddy, Bengaluru (IN); Sarvesh Kumar Thapa, Bengaluru (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/050,842

(22) Filed: Feb. 11, 2025

(51) Int. Cl.
*G06T 7/00* (2017.01)
*H04N 1/00* (2006.01)

(52) U.S. Cl.
CPC ....... *G06T 7/0002* (2013.01); *H04N 1/00005* (2013.01); *H04N 1/00018* (2013.01); *H04N 1/00029* (2013.01); *H04N 1/00082* (2013.01); *G06T 2200/24* (2013.01); *G06T 2207/10008* (2013.01); *G06T 2207/10056* (2013.01);
(Continued)

(58) Field of Classification Search
CPC ............. G06T 7/0002; G06T 7/0012; G06T 2207/10008; G06T 2207/10056; G06T 2207/20081; G06T 2207/30168; H04N 1/00005; H04N 1/00018; H04N 1/00029–00039; H04N 1/00068; H04N 1/00082
See application file for complete search history.

(56) References Cited

U.S. PATENT DOCUMENTS 6,370,277 B1    4/2002  Borrey et al.
6,711,283 B1 *  3/2004  Soenksen ............. H04N 23/631
                                                  382/128
(Continued)

FOREIGN PATENT DOCUMENTS

CN    115631159 A    1/2023
WO    2024008599 A1  1/2024

OTHER PUBLICATIONS

Bray, Mark-Anthony, et al. "Workflow and metrics for image quality control in large-scale high-content screens." Journal of biomolecular screening 17.2, pp. 266-274 (Year: 2012).*
(Continued)

*Primary Examiner* — Scott A Rogers
(74) *Attorney, Agent, or Firm* — Caldwell Intellectual Property Law

(57) ABSTRACT

An apparatus and method for rescan workflow management in automated scanning systems are disclosed. The apparatus includes a scanning system configured to initiate a scanning and rescanning operation for at least a slide, at least a processor and a memory containing instructions configuring the at least a processor to receive at least a scanned image, determine a quality metric of the at least a scanned image using at least a quality control algorithm, determine a quality error by comparing the quality metric to a quality threshold, receive, as a function of determining the quality error, a user input for the at least a scanned image, digitally map the user input to at least a corresponding region on the at least a slide, generate a scanner command as a function of the at least a corresponding region and transmit the scanner command to the scanning system.

20 Claims, 9 Drawing Sheets

(52) U.S. Cl.
CPC ............... *G06T 2207/20081* (2013.01); *G06T 2207/30168* (2013.01)

(56) References Cited

U.S. PATENT DOCUMENTS

| | | | |
|---|---|---|---|
| 8,165,363 B2 * | 4/2012 | Soenksen | ............. G06T 7/0002 382/128 |
| 10,878,293 B2 | 12/2020 | Campanella et al. | |
| 11,943,537 B2 | 3/2024 | Newberg et al. | |
| 11,978,191 B1 * | 5/2024 | Gangirevula | ......... G06T 7/0004 |

OTHER PUBLICATIONS

Campanella, Gabriele, et al. "Towards machine learned quality control: A benchmark for sharpness quantification in digital pathology." Computerized medical imaging and graphics 65, pp. 142-151 (Year: 2018).*

Hosseini, Mahdi S., et al. "Focus quality assessment of high-throughput whole slide imaging in digital pathology." IEEE transactions on medical imaging 39.1, pp. 62-74 (Year: 2019).*

Shrestha, Prarthana, et al. "A quantitative approach to evaluate image quality of whole slide imaging scanners." Journal of pathology informatics 7.1, pp. 56 (Year: 2016).*

Senaras, Caglar, et al. "DeepFocus: detection of out-of-focus regions in whole slide digital images using deep learning." PLoS ONE 13(10), e0205387 (Year: 2018).*

Zarella, Mark D., and Keysabelis Rivera Alvarez. "High-throughput whole-slide scanning to enable large-scale data repository building." The Journal of Pathology 257.4, pp. 383-390 (Year: 2022).*

Brixtel, Romain, et al. "Whole slide image quality in digital pathology: review and perspectives." IEEE Access 10, pp. 131005-131035 (Year: 2022).*

* cited by examiner

FIG. 2B

APPARATUS AND METHOD FOR RESCAN WORKFLOW MANAGEMENT IN AUTOMATED SCANNING SYSTEMS

FIELD OF THE INVENTION

The present invention generally relates to the field of scanning system. In particular, the present invention is directed to an apparatus and method for rescan workflow management in automated scanning systems.

BACKGROUND

Current systems for scanning slides often lack efficient mechanisms for identifying errors or inconsistencies in scanned images, making it challenging to initiate targeted rescanning operations. As a result, the scanning process may produce images with suboptimal quality in areas critical for diagnostic or analytical purposes. Accordingly, there exists a need for improved systems and methods for scanning slides that address deficiencies.

SUMMARY OF THE DISCLOSURE

In an aspect, an apparatus for rescan workflow management in automated scanning systems is disclosed. The apparatus includes a scanning system, wherein the scanning system is configured to initiate a scanning operation and a rescanning operation for at least a slide to generate at least a scanned image, at least a processor and a memory communicatively connected to the at least a processor, wherein the memory contains instructions configuring the at least a processor to receive the at least a scanned image, determine a quality metric of the at least a scanned image using at least a quality control algorithm, determine a quality error by comparing the quality metric to a quality threshold, receive, as a function of determining the quality error, a user input for the at least a scanned image, wherein the user input includes one or more corrective actions, digitally map the user input to at least a corresponding region on the at least a slide, generate a scanner command as a function of the at least a corresponding region, wherein the scanner command is configured to command the scanning system to prioritize the at least a corresponding region when rescanning the at least a slide and transmit the scanner command to the scanning system.

In another aspect, a method for rescan workflow management in automated scanning systems is disclosed. The method includes receiving, using at least a processor, at least a scanned image from a scanning system, wherein the scanning system is configured to initiate a scanning operation and a rescanning operation for at least a slide to generate the at least a scanned image, determining, using the at least a processor, a quality metric of the at least a scanned image using at least a quality control algorithm, determining, using the at least a processor, a quality error by comparing the quality metric to a quality threshold, receiving, using the at least a processor, a user input for the at least a scanned image as a function of determining the quality error, wherein the user input includes one or more corrective actions, digitally mapping, using the at least a processor, the user input to at least a corresponding region on the at least a slide, generating, using the at least a processor, a scanner command as a function of the at least a corresponding region, wherein the scanner command is configured to command the scanning system to prioritize the at least a corresponding region when rescanning the at least a slide and transmitting, using the at least a processor, the scanner command to the scanning system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-B illustrate exemplary illustrations of a graphical user interface;

DETAILED DESCRIPTION

At a high level, aspects of the present disclosure are directed to apparatuses and methods for rescan workflow management in automated scanning systems. The apparatus includes a scanning system, wherein the scanning system is configured to initiate a scanning operation and a rescanning operation for at least a slide to generate at least a scanned image, at least a processor and a memory communicatively connected to the at least a processor, wherein the memory contains instructions configuring the at least a processor to receive the at least a scanned image, determine a quality metric of the at least a scanned image using at least a quality control algorithm, determine a quality error by comparing the quality metric to a quality threshold, receive, as a function of determining the quality error, a user input for the at least a scanned image, wherein the user input includes one or more corrective actions, digitally map the user input to at least a corresponding region on the at least a slide, generate a scanner command as a function of the at least a corresponding region, wherein the scanner command is configured to command the scanning system to prioritize the at least a corresponding region when rescanning the at least a slide and transmit the scanner command to the scanning system. Exemplary embodiments illustrating aspects of the present disclosure are described below in the context of several specific examples.

Figure 1:
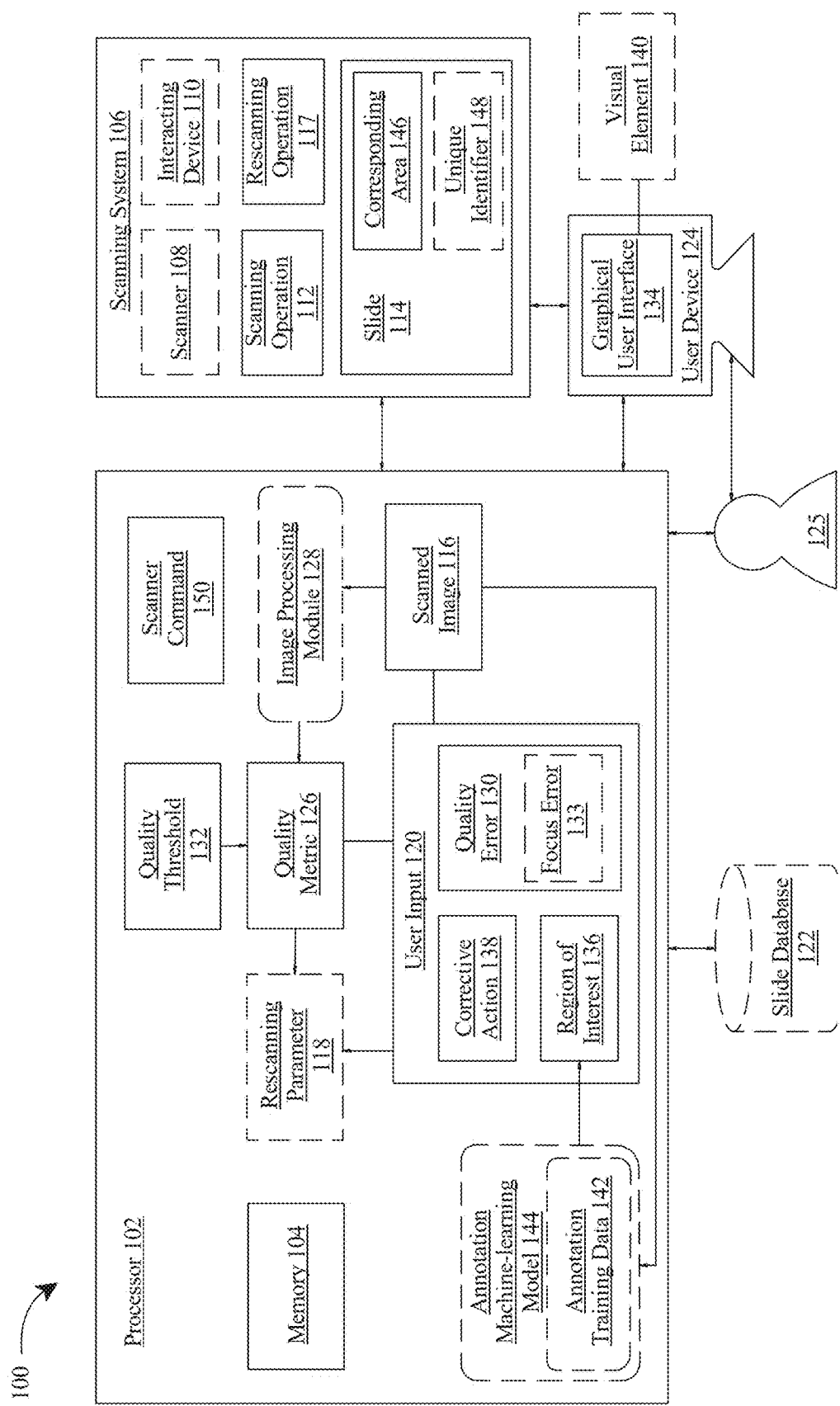
FIG. 1 illustrates a block diagram of an exemplary apparatus for rescan workflow management in automated scanning systems.

Referring now to FIG. 1, an exemplary embodiment of an apparatus 100 for rescan workflow management in automated scanning systems is illustrated. Apparatus 100 includes at least a processor 102. Processor 102 may include, without limitation, any processor described in this disclosure. Processor 102 may be included in a computing device. Processor 102 may include any computing device as described in this disclosure, including without limitation a microcontroller, microprocessor, digital signal processor (DSP) and/or system on a chip (SoC) as described in this disclosure. Processor 102 may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 104 communicatively connected to processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 includes a scanning system 106. For the purposes of this disclosure, a "scanning system" is a system that is configured to perform scanning. As a non-limiting example, scanning system 106 may include one scanner 108. In some embodiments, scanning system may include a group of components. As another non-limiting example, scanning system 106 may include a plurality of scanners 108, interacting device 110, slide storage, or the like. Scanning system 106 is configured to initiate a scanning operation 112 for at least a slide 114 to generate at least a scanned image 116. In a non-limiting example, scanning system 106 may be configured to scan a slide 114 and generate a scanned image 116 of the slide 114. In some embodiments, scanning system 106 may be configured for any type of scanning; for instance, and without limitation, slide scanning, pho scanning, document scanning, and the like. For the purposes of this disclosure, a "scanning operation" is a process that a scanning system produces a scanned image from a slide. In some embodiments, scanning operation 112 may include selecting a slide 114 from a slide storage, placing the slide 114 on a scanner 108, scanning the slide 114 and generating a scanned image 116 using the scanner 108, removing the slide 114 from the scanner, storing the slide 114 to the slide storage, and/or the like. In some embodiments, scanning operation 112 may include a rescanning operation 117. As used in this disclosure, a "rescanning operation" is a process to re-capture or re-analyze a physical slide. As a non-limiting example, rescanning operation 117 may include selecting a slide 114 from a slide storage, adjusting rescanning parameters 118 of a scanner 108, placing the slide 114 on the scanner 108, rescanning the slide 114 and generating a scanned image 116 using the scanner 108, removing the slide 114 from the scanner 108, storing the slide 114 to the slide storage, and/or the like. The rescanning parameter 118 disclosed herein is further described in this disclosure. In a non-limiting example, rescanning operation 117 may be configured to address identified errors, improve image quality, or capture additional data based on a specified condition or user input 120. The user input 120 disclosed herein is further described in this disclosure. In some embodiments, scanning operation 112 and rescanning operation 117 may be configured for any type of scanning. For example, and without limitation, scanning operation 112 and rescanning operation 117 may be configured for slide scanning, photo scanning, document scanning, and the like.

With continued reference to FIG. 1, for the purposes of this disclosure, a "slide" is a thin flat component used to hold objects for examination. As a non-limiting example, slide 114 may include a microscopic slide. For the purposes of this disclosure, a "scanned image" is a digital representation of a physical slide or object. As a non-limiting example, scanned image 116 may be a high-resolution digital image of a pathology specimen prepared on a microscope slide, scanned using a whole slide imaging (WSI) system. In another non-limiting example, scanning system 106 may be configured to executes instructions of a computer program. In another non-limiting example, scanning system 106 may be configured to store data into a hard drive. In some cases, scanning system 106 may include a plurality of scanning systems 106. As a non-limiting example, processor 102 may be configured to receive scanned images 116 from each scanner 108 of a plurality of scanners in five scanning systems 106 or any numbers of scanning systems 106. In some embodiments, scanning system 106 may include a cluster of scanners. For the purposes of this disclosure, a "scanner" is a device or an element of a device that outputs a scanned image. In a non-limiting example, scanner 108 may include a whole slide scanner used in pathology to digitize glass microscope slides containing tissue samples, enabling scanned image generation for remote diagnosis or archival purposes. In another non-limiting example, scanner 108 may include a fluorescence slide scanner designed to capture high-resolution images of slides prepared with fluorescently labeled biological specimens, allowing detailed examination of cellular or molecular markers in a clinical or research setting. In some embodiments, scanner 108 may be configured to receive a slide 114 from an interacting device 110. Interacting device 110 disclosed herein is further described below. In some embodiments, scanner 108 may be configured to examine, use, or the like a slide 114.

With continued reference to FIG. 1, for the purposes of this disclosure, an "interacting device" is a device that interacts with a functioning component to perform a specific task. Exemplary interacting device 110 may include a robotic arm, computing device, or the like. For the purposes of this disclosure, a "robotic arm" is a mechanical device or manipulator that mimics the structure and function of a human arm. In a non-limiting example, a robotic arm may pick up a slide 114 from a first slide storage, carry the slide 114 to scanner 108 and place the slide 114 on the scanner 108. Then, continuing the non-limiting example, the robotic arm may pick the grip slide 114 from the scanner 108, carry the slide 114 to a second slide storage and drop the slide 114 off to the second slide storage. In some cases, robotic arm or may interact with a plurality of scanner 108. For the purposes of this disclosure, a "slide storage" is a container that stores a slide. As a non-limiting example, slide storage may include a container for picking a slide 114 up using interacting device 110 or for dropping slide 114 off after use.

With continued reference to FIG. 1, in some embodiments, interacting device 110 disclosed herein may be consistent with a robotic arm described in U.S. patent application Ser. No. 18/382,386, filed on Oct. 20, 2023, entitled "APPARATUS AND METHOD OF USE OF A MECHANISM THAT CONVERTS ROTARY MOTION INTO LINEAR MOTION," which is incorporated herein by reference in its entirety. Additional disclosure related to interacting device 110 may be found in U.S. patent application Ser. No. 18/385,978, filed on Nov. 1, 2023, entitled "METHOD AND SYSTEM FOR AUTOMATED RETRIEVAL AND SCANNING OF GLASS SLIDES WITHIN A RESTRICTED SPATIAL ENVIRONMENT," which is incorporated herein by reference in its entirety. In some embodiments, scanning system 106, scanner 108 and interacting device 110 disclosed herein may be consistent, respectively, with a cluster, functioning component and interacting device described in U.S. patent application Ser. No. 18/538,959, filed on Jul. 23, 2023, entitled "APPARATUS AND METHOD OF HOT-SWAPPING A COMPONENT OF A COMPONENT UNIT IN A CLUSTER," which is incorporated herein by reference in its entirety.

With continued reference to FIG. 1, memory 104 contains instructions configuring processor 102 to receive at least a scanned image 116. In some embodiments, processor 102 may receive scanned image 116 from a scanner 108. In some embodiments, processor 102 may receive scanned image 116 from a slide database 122. in some embodiments, apparatus 100 may include a slide database 122. As used in this disclosure, "slide database" is a data structure configured to store data associated with a slide. As a non-limiting example, slide database 122 may store scanned image 116, and the like as described below. In one or more embodiments, slide database 122 may include inputted or calculated information and datum related to a slide 114. In some embodiments, a datum history may be stored in slide database 122. As a non-limiting example, the datum history may include real-time and/or previous inputted data related to slide 114. As a non-limiting example, slide database 122 may include instructions from a user, who may be an expert user, a past user in embodiments disclosed herein, or the like, where the instructions may include examples of the data related to slide 114.

With continued reference to FIG. 1, in some embodiments, processor 102 may be communicatively connected with slide database 122. For example, and without limitation, in some cases, slide database 122 may be local to processor 102. In another example, and without limitation, slide database 122 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store slide database 122. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, slide database 122 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 102 may receive scanned image 116 from a user device 124. For the purposes of this disclosure, a "user device" is any device that a user uses to input data. For the purposes of this disclosure, a "user" is any individual or entity that uses an apparatus. As a non-limiting example, user device 124 may include a laptop, desktop, tablet, mobile phone, smart phone, smart watch, kiosk, screen, smart headset, or things of the like. In some embodiments, user device 124 may include an interface configured to receive inputs from a user 125. In some embodiments, a user 125 may manually input any data (e.g., scanned image 116) into apparatus 100 using user device 124. In some embodiments, user 125 may have a capability to process, store or transmit any information independently.

With continued reference to FIG. 1, memory 104 contains instructions configuring processor 102 determine a quality metric 126 of at least a scanned image 116 using at least a quality control algorithm. As used herein, a "quality metric" is a datum describing an assessment of a quality, section, or feature of an image. In a non-limiting example, quality metric 126 may describe a degree to which a scanned image 116 and/or a section of scanned image 116 is in focus. Non-limiting examples of quality metrics 126 include localization quality metric, focus sampling quality metric 126, biopsy plane estimation quality metric, z-stack acquisition quality metric, banding quality metric, and stitching quality metric, each of which is described further herein. In some embodiments, processor 102 may determine multiple quality metrics. For example, processor 102 may determine localization quality metric, focus sampling quality metric 126, biopsy plane estimation quality metric, z-stack acquisition quality metric, and stitching quality metric simultaneously. In some embodiments, processor 102 may determine one or more rescanning parameters 118 and/or capture one or more images based on such quality metrics 126. For example, processor 102 may first determine localization quality metric, then may determine a rescanning parameter 118 and may capture a subsequent image using such rescanning parameter 118. Processor 102 may then determine focus sampling quality metric 126, may determine a subsequent rescanning parameter 118, and may capture a subsequent image using such rescanning parameter 118. The rescanning parameter 118 disclosed herein is further described below. In some embodiments, quality metric 126 may be stored in slide database 122. In some embodiments, processor 102 may retrieve quality metric 126 from slide database 122.

With continued reference to FIG. 1, as used herein, a "localization quality metric" is a quality metric which assesses a localization of a sample in a scanned image. In some embodiments, localization quality metric may include one or more composite measures used to detect and position a sample (e.g., tissue) within a scanned image 116. As used herein, a "biopsy plane estimation quality metric" is a quality metric which assesses identification of a plane which contains a biological specimen. As used herein, a "focus sampling quality metric" is a quality metric which assesses identification of a focal setting at which a selected point is in focus. As used herein, a "z-stack acquisition quality metric" is a quality metric which assesses the fidelity, clarity, and accuracy of a scanned image captured during a z-stack acquisition process. In some embodiments, z-stack acquisition quality metric 126 may include overall quality of a series of scanned images 116 acquired at different focal depths to represent a three-dimensional structure or feature of a specimen. As used herein, a "stitching quality metric" is a quality metric which assesses accuracy and fidelity of the process of combining multiple image segments or tiles into a single cohesive image. In some embodiments, stitching quality metric 126 may evaluate effectiveness of a stitching process in aligning adjacent image segments of scanned images 116 along their borders and ensuring seamless integration of overlapping regions. As used herein, a "banding quality metric" is a quality metric which assesses presence, severity, or impact of banding artifacts in an image. As a non-limiting example, banding artifacts may include unintended repetitive patterns, lines, or bands that can occur in scanned image 116 due to inconsistencies in illumination, sensor performance, or image processing algorithms. In some embodiments, additional disclosure related to quality metric 126 may be found in U.S. patent application Ser. No. 18/602,947, filed on Mar. 12, 2024, entitled "SYSTEMS AND METHODS FOR INLINE QUALITY CONTROL OF SLIDE DIGITIZATION," which is incorporated herein by reference in its entirety.

With continued reference to FIG. 1, for the purposes of this disclosure, a "quality control algorithm" is an algorithm that determines a quality metric of a scanned image. In some embodiments, quality control algorithm may include any algorithms described in this disclosure configured for determining focus, banding, or missing tissue, and the like. As a non-limiting example, quality control algorithm may include image processing module 128. In some embodiments, processor 102 may determine quality metric 126 using an image processing module 128. As used in this disclosure, an "image processing module" is one or more image processing technique designed to perform processing tasks and or operations to a digital image. For example, and without limitation, image processing module 128 may be configured to compile plurality of digital images to create an integrated image. In an embodiment, image processing module 128 may include a plurality of software algorithms that can analyze, manipulate, or otherwise enhance an image, such as, without limitation, a plurality of image processing techniques as described below. Image processing module 128 may include, without limitation, modules that perform modifications such as random rotation, color jitter, Gaussian blur, perspective transform, shear transform, shadow casting, reflected light, ink color swap, noise texturization, Gaussian noise, salt and pepper noise, folding and creasing, crumpled paper effect, and the like, and described in detail above. In a non-limiting example, image processing module 128 may include any combination of image processing module 128. In some cases, image processing module 128 may be implemented with one or more image processing libraries such as, without limitation, OpenCV, PIL/Pillow, ImageMagick, and the like. Image processing module 128 may include, be included in, or be communicatively connected to processor 102, and/or memory 104.

With continued reference to FIG. 1, in an embodiment, image processing module 128 may be configured to compress and/or encode scanned images 116 to reduce the file size and storage requirements while maintaining the essential visual information needed for further processing steps as described below. In an embodiment, compression and/or encoding of plurality of images may facilitate faster transmission of images. In some cases, image processing module 128 may be configured to perform a lossless compression on images, wherein the lossless compression may maintain the original image quality of images. In a nonlimiting example, image processing module 128 may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of scanned images 116 may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module 128 may be configured to perform a lossy compression on plurality of images, wherein the lossy compression may sacrifice some image quality of images to achieve higher compression ratios. In a non-limiting example, image processing module 128 may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, image processing module 128 may determine a degree of blurriness of images. In a non-limiting example, image processing module 128 may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 128 may be configured to rank scanned images 116 according to quality metric 126 and select a highest-ranking image from a plurality of scanned images 116.

With continued reference to FIG. 1, memory 104 contains instructions configuring processor 102 to determine a quality error 130 by comparing quality metric 126 to a quality threshold 132. For the purposes of this disclosure, a "quality error" is an issue, defect, or deviation within a scanned image that affects a quality metric of the scanned image. Quality error 130 identifies a quality metric 126 below a quality threshold 132. The quality threshold 132 is further described in detail below. In some embodiments, user input 120 may confirm or identify a quality error 130. In some embodiments, user input 120 may confirm or identify that a quality metric 126 is higher than quality threshold 132. In a non-limiting example, user input 120 may indicate that there is no quality error 130 in scanned image 116 and the scanned image 116 may get stored in a database. In some embodiments, quality error 130 may be associated with quality metric 126. As a non-limiting example, quality error 130 may include missing tissue, banding error, stitching error, focus error 133, scan area error, and the like. In a non-limiting example, quality error 130 may include specimen not detected or missed in scanned image 116, out-of-focus regions caused by artifacts or thick samples, banded artifacts (e.g., stitching errors or calibration issues), ghost-like artifacts due to errors in stitching adjacent fields of view, and the like. For the purposes of this disclosure, a "focus error" is a deviation or inconsistency in the sharpness or clarity of a scanned image. In some embodiments, user 125 may manually determine quality error 130. In some embodiments, processor 102 may determine quality error 130 as a function of quality metric 126 and quality threshold 132. In some embodiments, user 125 may analyze scanned image 116 or quality metric 126 of scanned image 116 and determine that scanned image 116 may include quality error 130. In some embodiments, processor 102 may determine quality error 130 based on quality metric 126 and quality threshold 132. In a non-limiting example, processor may determine that a scanned image 116 has quality error 130 when quality metric 126 of the scanned image 116 is below a quality threshold 132. In some embodiments, quality error 130, quality metric 126 and quality threshold 132 may be stored in slide database 122. In some embodiments, graphical user interface (GUI) 134 may include highlighted elements that highlights quality error 130 of scanned image 116. As used in this disclosure, "highlighted elements" are regions, objects, or features within a graphical user interface that are emphasized through visual indicators.

With continued reference to FIG. 1, as used in this disclosure, a "quality threshold" is a predefined or dynamically generated reference value, condition, or set of criteria against which data is compared to determine the need for additional actions. In a non-limiting example, quality threshold 132 may be a baseline metric for determining quality error 130 based on a quality metric 126. As a non-limiting example, quality threshold 132 may include a metric for resolution, brightness, or focus sharpness, banding, stitching, localization, biopsy plane estimation, established by apparatus 100 or user 125 for a scanned image 116. For example, and without limitation, if an initial scan does not meet quality threshold 132, processor 102 may trigger rescanning operation 117 to improve the quality. In another non-limiting example, quality threshold 132 may be a specific region of interest identified in a digital slide for diagnostic purposes. For example, and without limitation, processor 102 may compare scanned image 116 to quality threshold 132 and initiate rescanning if discrepancies, such as missing tissue sections or artifacts, are detected. In an embodiment, without limitation, quality threshold 132 may represent a threshold value for fluorescence intensity in a scanned image 116 used in immunohistochemistry. Without limitation, if the fluorescence signal of the scanned image 116 falls below this value, the processor 102 may adjust rescanning parameters 118, such as exposure time, and may perform a rescanning operation 117 to achieve a more accurate representation. In some embodiments, quality threshold 132 may be stored in slide database 122. In some embodiments, user 125 may manually determine quality threshold 132.

With continued reference to FIG. 1, in some embodiments, processor 102 may generate quality threshold 132 based on historical quality errors. In some embodiments, processor 102 may update quality threshold 132 based on corrective actions 138 and/or user input 120. In some embodiments, processor 102 may generate or update quality threshold 132 using a threshold machine-learning model. In some embodiments, processor 102 may be configured to generate threshold training data. In a non-limiting example, threshold training data may include correlations between exemplary quality thresholds, exemplary quality errors, exemplary corrective actions, and/or exemplary user inputs. In some embodiments, threshold training data may be stored in database. In some embodiments, threshold training data may be received from one or more users, database, external computing devices, and/or previous iterations of processing. As a non-limiting example, threshold training data may include instructions from a user, who may be an expert user, a past user in embodiments disclosed herein, or the like, which may be stored in memory and/or stored in database, where the instructions may include labeling of training examples. In some embodiments, threshold training data may be updated iteratively on a feedback loop. As a non-limiting example, processor 102 may update threshold training data iteratively through a feedback loop as a function of quality error 130, corrective action 138, user input 120, quality metric 126, or the like. In some embodiments, processor 102 may be configured to generate a quality machine-learning model. In a non-limiting example, generating quality machine-learning model may include training, retraining, or fine-tuning quality machine-learning model using threshold training data or updated threshold training data. In some embodiments, processor 102 may be configured to determine quality threshold 132 using quality machine-learning model (i.e. trained or updated quality machine-learning model). In some embodiments, generating training data and training machine-learning models may be simultaneous.

With continued reference to FIG. 1, in some embodiments, processor 102 may determine quality error 130 using an image processing module 128, or an error machine-learning model. In some embodiments, processor 102 may generate error training data including exemplary scanned images and exemplary quality errors, train error machine-learning model using the error training data and determine quality error 130 using the trained error machine-learning model. In some embodiments, error machine-learning model and error training data disclosed herein may be consistent with any machine-learning model and training data described in this disclosure. In some embodiments, error training data may be stored in slide database 122. In some embodiments, error training data may be received from one or more users, slide database 122, external computing devices, and/or previous iterations of processing. As a non-limiting example, error training data may include instructions from a user, who may be an expert user, a past user in embodiments disclosed herein, or the like, which may be stored in memory and/or stored in slide database 122, where the instructions may include labeling of training examples. In some embodiments, error training data may be updated iteratively on a feedback loop. As a non-limiting example, processor 102 may update error training data iteratively through a feedback loop as a function of scanned image 116, quality threshold 132, quality metric 126, output of any machine-learning models described in this disclosure, or the like.

With continued reference to FIG. 1, in some embodiments, processor 102 may generate notification or user interface that notifies a user 125 whether at least a slide 114 has to be rescanned or not based on quality error 130, quality metric 126 and/or quality threshold 132. For the purposes of this disclosure, a "notification" is an indication to inform a user. In some embodiments, processor 102 may transmit notification to user device 124. In some embodiments, notification may include audio, text, image, vibration, and the like. In some embodiments, notification may include a text message, notification sound, phone call, notification banner, or the like.

With continued reference to FIG. 1, memory 104 contains instructions configuring processor 102 to receive a user input 120 for at least a scanned image 116 with a quality error 130. For the purposes of this disclosure, a "user input" is an action, command, or data entry provided by a user to interact with a system. In some embodiments, user input 120 may include touch, voice, text, or graphical selection. In some embodiments, user input 120 may be input by a plurality of users 125. As a non-limiting example, user 125 may include a quality control engineer or technician, research technician, researcher, and the like. In some embodiments, user input 120 may determine whether slide 114 needs to be rescanned.

With continued reference to FIG. 1, in some embodiments, user input 120 may identify at least a region of interest (ROI) 136 on at least a scanned image 116 and one or more corrective actions 138 associated with the at least a ROI 136 and a quality metric 126 and/or quality error 130. For the purposes of this disclosure, a "region of interest" is an area within a scanned image that is selected for processing or analysis. As a non-limiting example, ROI 136 may include an area within a scanned image 116 that has a specimen or tissue. In some embodiments, user 125 may input ROI 136 using graphical tools through graphical user interface 134. In some embodiments, processor 102 may determine or generate ROI 136 through the use of machine-learning model or as a function of quality error 130.

With continued reference to FIG. 1, user input includes corrective actions 138. For the purposes of this disclosure, a "corrective action" is an operation, adjustment, or modification applied to a scanned image or associated metadata. As a non-limiting example, corrective action 138 may include updating metadata, data related to slide 114, parameters of slide 114, and the like. In some embodiments, corrective action 138 may be conducted by a user 125 or by a processor 102. In a non-limiting example, processor 102 may conduct a corrective action 138 when quality error 130 is determined. In some embodiments, corrective action 138 may be configured to rectify quality error 130. As a non-limiting example, corrective action 138 may include adding, modifying or removing a visual element 140 using graphical user interface 134. The visual element 140 disclosed herein is further described below. For example, and without limitation, corrective action 138 may include drawing, highlighting, or bounding box placing, or by specifying coordinates or dimensions within scanned image 116. For example, and without limitation, corrective action 138 may include placing a bounding box (visual element 140) on a scanned image 116 for tissue or sample that is not identified through a system (e.g., localization quality metric). For example, and without limitation, corrective action 138 may include adjusting a size of a bounding box (visual element 140) on a scanned image 116 through graphical user interface (GUI) 134. The GUI 134 is further described in detail below. For example, and without limitation, corrective action 138 may include removing debris, artifacts, stains, smudges, DPX, or the like from a slide 114 and/or placing a sampling point or a bounding box (visual element 140) on a scanned image 116 to remove the specific ROI for rescanning. For example, and without limitation, corrective action 138 may include modifying bounding box to incorporate an area (ROI 136) that was not localized as the area includes specimens that are extremely tiny or faint (missing tissue quality error and/or localization quality metric), mark the modified bounding box using a visual element 140 indicating that the ROI 136 must be rescanned. For example, and without limitation, corrective action 138 may include modifying bounding box (visual element 140) from scanned image 116 to remove artifacts, debris, DPS, smudges or stain deposits when specimen was localized in the scanned image 116 but not scanned properly (missing tissue quality error and/or biopsy plane estimation quality metric) and place a sampling point (visual element 140) on ROI 136 of scanned image 116 indicating specimen for scanning or rescanning. For example, and without limitation, corrective action 138 may include correcting an optical centering either by a user 125 or technician for banding quality metric. For example, and without limitation, corrective action 138 may include calibrating a displacement for gradual workout in the calibrated displacement values (stitching error and/or stitching quality metric). For example, and without limitation, corrective action 138 may include adjusting a bounding box to remove a slide artifact within a scanned image 116 and place a sampling point on a region (ROI 136) that encloses by a sample on a scanned image 116 that has quality error due to artifacts that are included along with the specimen. For example, and without limitation, corrective action 138 may include a user removing bounding boxes through a user interface that are not meant to be scanned for a scanned image 116 that has any additional bounding boxes or ROIs 136 detected on scanned image 116 (scan area error) due to debris, smudges, stain deposits, and the like. For example, and without limitation, corrective action 138 may include reducing scanning area for rescanning operation 117. In some embodiments, receiving a user input 120 may include receiving a user input 120 including a modification of visual element 140 associated with at least an ROI 136 and determining at least one of one or more corrective actions 138 as a function of the modification of the visual element 140.

With continued reference to FIG. 1, for example, and without limitation, corrective action 138 may include increasing a stack size (e.g., z-stack) for a slide 114 that is marked for rescan due to focus error 133 and/or focus quality metric 126 that may be caused by massive folds or extremely thick specimen. For the purposes of this disclosure, "increasing a stack size" refers to capturing additional focal planes during the rescanning process to generate a more comprehensive z-stack. For the purposes of this disclosure, a "z-stack" is a series of images captured at varying focal depths to create a three-dimensional representation of the specimen. In some embodiments, corrective action 138 may include dynamically adjusting z-stack interval (the distance between focal planes) or extending the range of focal planes. For instance, and without limitation if the focus quality metric 126 falls below a predefined quality threshold 132, processor 102 may generate a scanner command 150 to modify z-stack parameters (e.g., rescanning parameter 118) for the affected region (ROI 136). In some embodiments, user input 120 may specify ROI 136 requiring enhanced z-stack coverage, allowing scanning system 106 to prioritize the ROI 136 during rescanning operation 117. Additional disclosure related to modifying stack size and rescanning operation may be found in U.S. Patent Application No. 18,226,058, filed on May 14, 2024, entitled "IMAGING DEVICE AND A METHOD FOR IMAGE GENERATION OF A SPECIMEN," which is incorporated herein by reference in its entirety.

With continued reference to FIG. 1, as used in this disclosure, a "visual element" is a component or feature within a system, display, or interface that conveys information through visual means. In a non-limiting example, visual element 140 may include text, images, icons, shapes, colors, and/or other graphical components designed to be perceived by a user 125. In a non-limiting example, visual element 140 may aid in communication, navigation, and/or interaction with the system. Without limitation, visual element 140 may be used to enhance user experience, guide behavior, and/or represent data visually in an intuitive or informative way. In some embodiments, visual element 140 may include any data transmitted to user device 124, and/or graphical user interface 134. In some embodiments, visual element 140 may include an interface, such as a button or menu. In some embodiments, visual element 140 may be interacted with using a user device 124 such as a smartphone, tablet, smartwatch, or computer.

With continued reference to FIG. 1, in some embodiments, if there is no user input 120, then processor 102 may proceed to rescanning operation 117 without any modification or update. In some embodiments, determining quality error 130 may include generating annotation training data 142, wherein the annotation training data 142 may include exemplary scanned images correlated to exemplary ROIs with quality errors, training an annotation machine-learning model 144 using the annotation training data 142, determining at least a ROI 136 using the trained annotation machine-learning model 144 and determining quality error 130 as a function of the at least a ROI 136. In a non-limiting example, processor 102 may determine quality metric 126 of ROI 136 of scanned image 116. In another non-limiting example, processor 102 may determine quality metric 126 of whole scanned image 116. For the purposes of this disclosure, "annotation training data" is data containing correlations that a machine-learning process may use to model relationships between scanned images and ROIs. For the purposes of this disclosure, an "annotation machine-learning model" is a machine-learning model that determines ROIs. In some embodiments, annotation training data 142 may be stored in slide database 122. In some embodiments, annotation training data 142 may be received from one or more users, slide database 122, external computing devices, and/or previous iterations of processing. As a non-limiting example, annotation training data 142 may include instructions from a user, who may be an expert user, a past user in embodiments disclosed herein, or the like, which may be stored in memory and/or stored in slide database 122, where the instructions may include labeling of training examples. In some embodiments, annotation training data 142 may be updated iteratively on a feedback loop. As a non-limiting example, processor 102 may update annotation training data 142 iteratively through a feedback loop as a function of scanned image 116, quality metric 126, quality threshold 132, historical user inputs, or the like. In a non-limiting example, generating annotation machine-learning model 144 may include training, retraining, or fine-tuning annotation machine-learning model 144 using annotation training data 142 or updated annotation training data 142. In some embodiments, annotation machine-learning model 144 may include machine vision module or image processing module. In some embodiments, receiving user input 120 may include generating a graphical user interface 134 including at least a ROI 136 determined using annotation machine-learning model 144, wherein the at least a ROI 136 may be visually indicated within at least a scanned image 116 using a visual element 140. As a non-limiting example, ROI 136 may be visually indicated using a bounding box or sampling point.

With continued reference to FIG. 1, receiving user input 120 may include generating a graphical user interface 134 including at least a scanned image 116 and quality metric 126. For the purposes of this disclosure, a "user interface" is a means by which a user and a computer system interact; for example through the use of input devices and software. A user interface may include a graphical user interface (GUI) 134, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user 125 may interact with user interface in virtual reality. In some embodiments, a user may interact with the use interface using a computing device distinct from and communicatively connected to at least a processor 102. For example, a smart phone, smart, tablet, or laptop operated by a user 125. In an embodiment, user interface may include a graphical user interface 134. A "graphical user interface," as used herein, is a graphical form of user interface that allows users to interact with electronic devices. In some embodiments, GUI 134 may include icons, menus, other visual indicators or representations (graphics), audio indicators such as primary notation, and display information and related user controls. A menu may contain a list of choices and may allow users 125 to select one from them. A menu bar may be displayed horizontally across the screen such as pull-down menu. When any option is clicked in this menu, then the pull-down menu may appear. A menu may include a context menu that appears only when the user 125 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, memory 104 contains instructions configuring processor 102 to digitally map a user input 120 to at least a corresponding region 146 on at least a slide 114. For the purposes of this disclosure, a "corresponding region" is an area on a physical slide that aligns with or is associated with a region of interest (ROI) identified within a scanned image. In some embodiments, corresponding region 146 may represent a physical counterpart of ROI 136 and may serve as a target for actions, analysis, or validation processes (scanning operation 112 or rescanning operation 117). For the purposes of this disclosure, "mapping digitally" refers to a process of establishing a spatial or logical relationship between a corresponding region and a region of interest. In some embodiments, processor 102 may translate coordinates, dimensions, or positional information from region of interest 136 to corresponding region 146 or vice versa.

With continued reference to FIG. 1, in some embodiments, processor 102 may digitally map a user input 120 to at least a corresponding region 146 using a machine vision system. For the purposes of this disclosure, a "machine vision system" is a type of technology that enables a computing device to inspect, evaluate and identify still or moving images. In some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection (e.g., sample, tissue, or ROI 136), face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., unique identifier 148) detection and decoding. The unique identifier 148 is further described in detail below. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, digitally mapping user input 120 to at least a corresponding region 146 on at least a slide 114 may include extracting a unique identifier 148 from at least a scanned image 116 and associating the user input 120 to the at least a slide 114 as a function of the unique identifier 148. for the purposes of this disclosure, a "unique identifier" is an identifier that is unique for an object among others. As a non-limiting example, the unique identifier 148 may include a universal product code (barcode), radio-frequency identification (RFID), cryptographic hashes, primary key, a unique sequencing of alpha-numeric symbols, or anything of the like that can be used to identify slide 114 or scanned image 116. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like.

With continued reference to FIG. 1, in some embodiments, extracting unique identifier 148 may include extracting unique identifier 148 using an optical character recognition (OCR). For the purposes of this disclosure, "optical character recognition" is a technology that enables the recognition and conversion of printed or written text into machine-encoded text. In some cases, the at least a processor 102 may be configured to recognize a keyword using the OCR to find unique identifier 148. As used in this disclosure, a "keyword" is an element of word or syntax used to identify and/or match elements to each other. In some cases, the at least a processor 102 may transcribe much or even substantially all scanned image 116.

With continued reference to FIG. 1, in some embodiments, optical character recognition or optical character reader (OCR) may include automatic conversion of images of written (e.g., typed, handwritten or printed text) text into machine-encoded text. In some cases, recognition of a keyword from scanned image 116 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of scanned image 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the scanned image 116 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes scanned image 116. Since the adaptive classifier may have learned something useful a little too late to recognize characters on the first pass, a second pass may be run over the scanned image 116. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, memory 104 contains instructions configuring processor 102 to generate a scanner command 150 as a function of at least a corresponding region 146, wherein the scanner command 150 is configured to command a scanning system 106 to prioritize at least a corresponding region 146 when rescanning at least a slide 114. Memory 104 contains instructions configuring processor 102 to transmit the scanner command 150 to a scanning system 106. For the purposes of this disclosure, a "scanner command" is an instruction or set of instructions for to a scanning system to control or modify its operation. In some embodiments, scanner command 150 may include actions to be executed by scanning system 106. In some embodiments, user 125 may manually input scanner command 150. In some embodiments, scanner command 150 may be stored in slide database 122. In some embodiments, user inputs 120 or any results of user inputs 120 may be stored in slide database 122. In some embodiments, rescanning operation 117 may include checking slide database 122 for any manual quality control input to use. In a non-limiting example, if processor 102 finds user input 120 related to a slide to be rescanned from slide database 122, processor 102 may compare slides 114 or scanned images 116 from both scanning operation 112 and rescanning operation 117 and rescan the slide 114 as a function of the comparison. In some embodiments, if processor 102 cannot find user input 120 related to a slide to be rescanned from slide database 122, then processor 102 may proceed for a rescan without any modification.

With continued reference to FIG. 1, in some embodiments, generating scanner command 150 may include determining one or more rescanning parameters 118 for rescanning at least a slide 114 as a function of user input 120 and quality metric 126 and generating the scanner command 150 as a function of the one or more rescanning parameters 118. For the purposes of this disclosure, a "rescanning parameter" is a configurable or measurable attribute that defines or influences an operation, performance, or output of a scanner.

As a non-limiting example, rescanning parameter 118 may include resolution, magnification, focus settings, illumination intensity, scanning speed, or sensor sensitivity of a scanner in a scanning system 106. As another non-limiting example, rescanning parameters 118 may include scanning mode (e.g., brightfield, fluorescence), z-stack interval, or dimensions of an area (that aligns with ROI 136 and/or corresponding region 146) to be scanned, and the like. In a non-limiting example, processor 102 may determine rescanning parameter 118 that can rectify quality error 130. In some embodiments, scanner command 150 may be configured to command at least a scanner 108 of a plurality of scanners 108 of the scanning system 106 to rescan at least a slide 114 as a function of one or more rescanning parameters 118. In some embodiments, scanner command 150 may be further configured to command an interacting device 110 of scanning system 106 to select at least a slide 114 to be rescanned as a function of unique identifier 148. In a non-limiting example, interacting device 110 may select at least a slide that matches unique identifier 148 from a plurality of slides stored in a slide storage. As another non-limiting example, rescanning parameter 118 may include any feature of robotic arm of a scanning system 106.

With continued reference to FIG. 1, in a non-limiting example, rescanning operation 117 may be triggered when processor 102 detects that the initial scan (scanned image 116) of a slide 114 is out of focus (focus error 133). Continuing, rescanning operation 117 may adjust rescanning parameters 118 of a scanner 108 and re-capture scanned image 116 to produce a sharper and more accurate digital representation. In another non-limiting example, a user 125 may identify a region of interest 136 on a scanned image 116 using a graphical user interface 134 and select it for rescanning. Continuing, rescanning operation 117 may then be executed by configuring scanner 108 to capture higher-resolution data for the specified area, providing detailed imagery for further analysis. In some embodiments, initial scanning parameters used for scanning operation 112 may be used for rescanning operation 117. In an embodiment, without limitation, rescanning operation 117 may involve identifying discrepancies between an original scanned image and a target data model, such as missing tissue regions. In some embodiments, processor 102 may automatically adjust one or more rescanning parameters 118 of scanner 108, such as exposure or magnification, and perform rescanning to capture the corrected or missing information. Continuing the previous non-limiting example, a rescanning operation 117 may also involve capturing additional layers of a slide 114 when a depth-of-field issue is detected in the initial scan (scanned image 116). One or more rescanning parameters 118 of scanner 108 may modify a stack size or focus intervals to generate a layered or 3D representation of the slide 114. In some embodiments, processor 102 may generate GUI 134 including an indication that indicates whether scanned image 116 is rescanned or not. As a non-limiting example, indication may include text, image, icon, video, and the like. For example, and without limitation, a checkbox indicating scanned image 116 is rescanned or not may be checked.

Figure 2A:
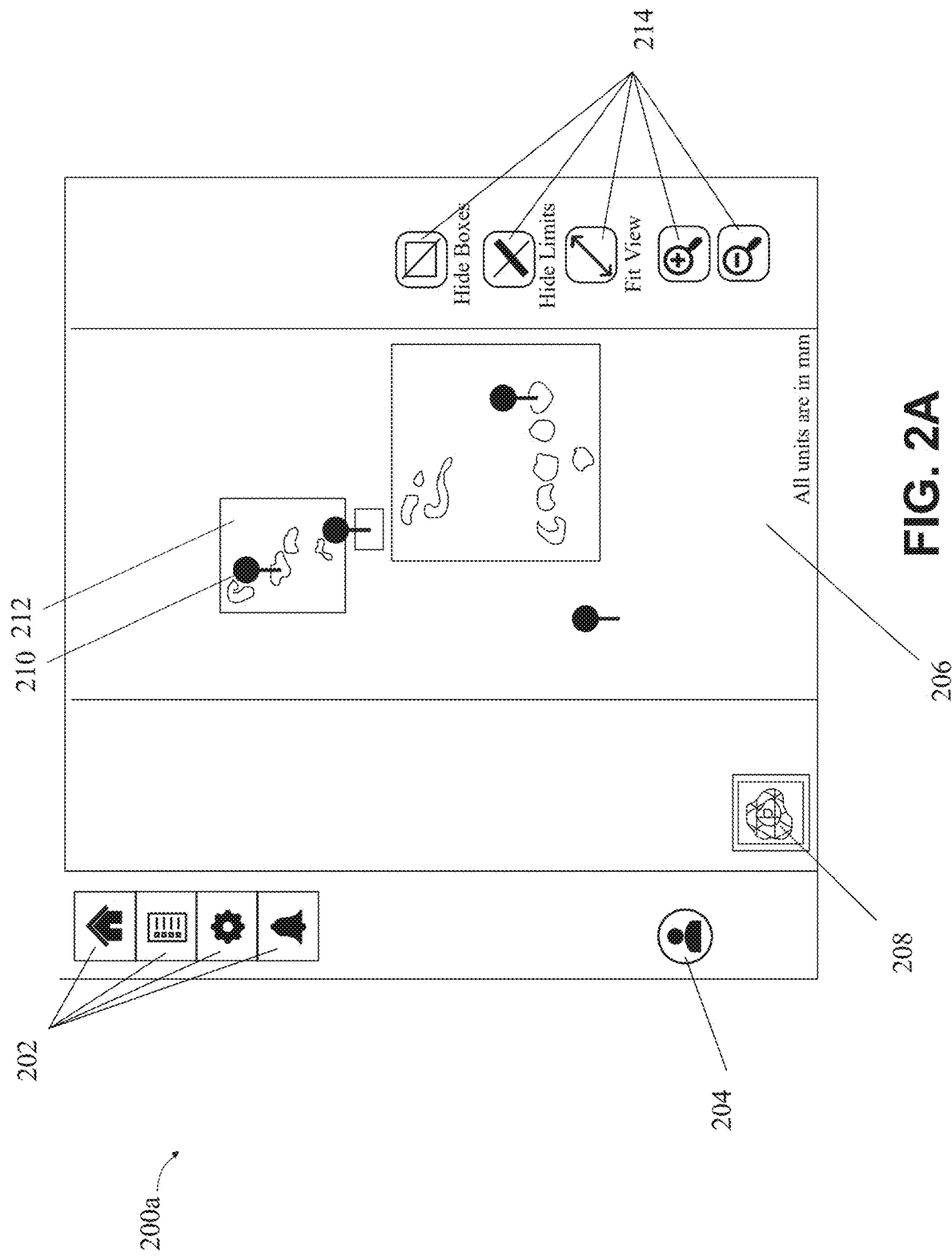
Figure 2B:
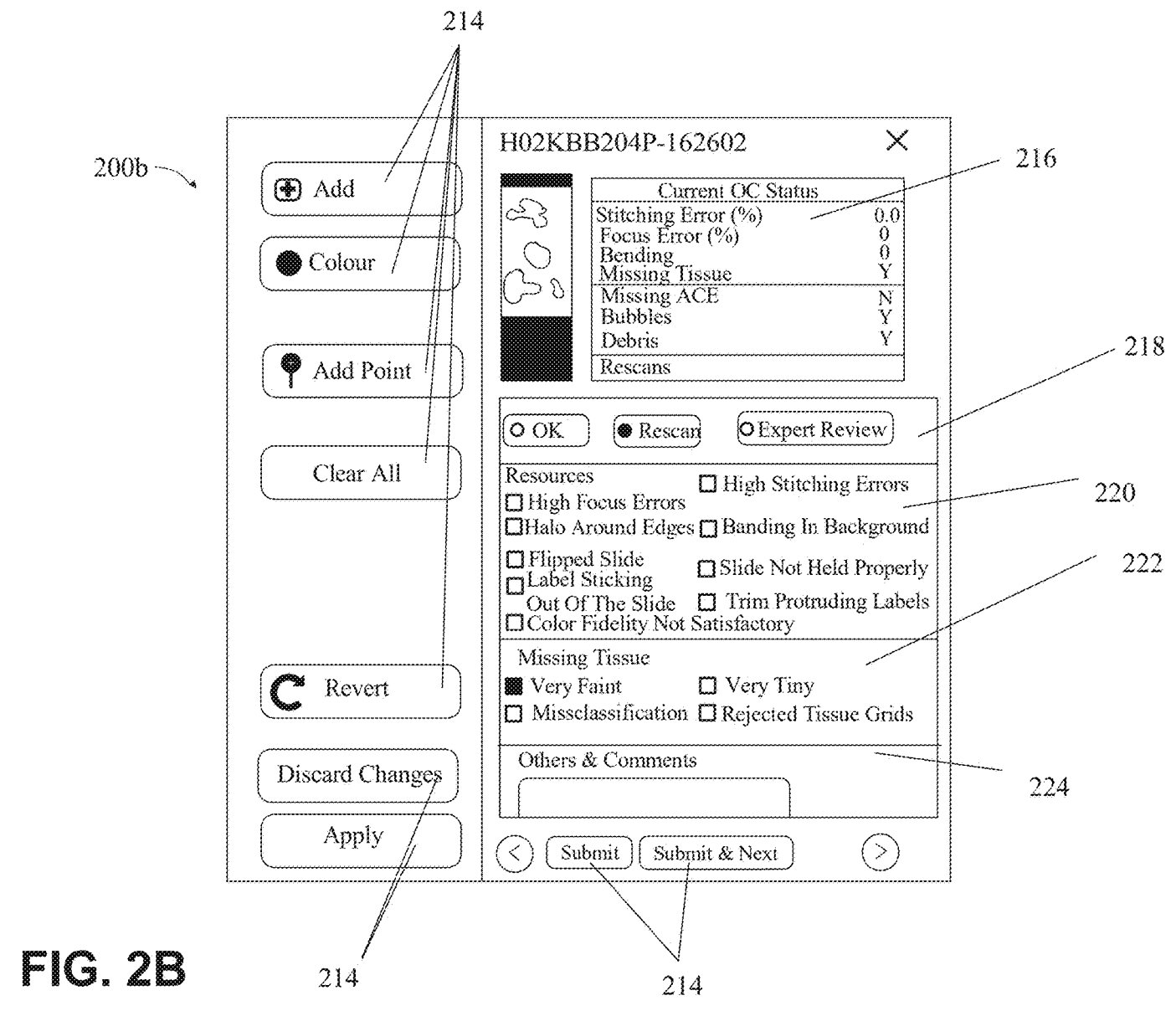

Referring now to FIG. 2A-B, exemplary illustrations 200a-b of a graphical user interface 134 are illustrated. In an embodiment, FIG. 2A may represent the left side of graphical user interface 134. In an embodiment, FIG. 2B may represent the right side of the graphical user interface 134. In an embodiment, illustrations 200a-b may include menu elements 202. As used in this disclosure, "menu elements" are graphical components within the graphical user interface that provide a list or grid of options, commands, or features, enabling users to navigate and interact with the system or perform specific actions. In an embodiment, illustration 200a-b may include a profile icon 204. As used in this disclosure, a "profile icon" is a graphical representation that identifies a user, group, or entity within the graphical user interface. In an embodiment, profile icon 204 may serve as an interactive element to access user-specific settings, preferences, or account-related features. In an embodiment, illustration 200a-b may include a first window 206. As used in this disclosure, a "first window" is a defined section or pane within the graphical user interface that displays specific content, data, or tools, providing a workspace or area for user interaction or visualization. In an embodiment, illustration 200a-b may include a corner visual 208. As used in this disclosure, a "corner visual" is a graphical element positioned in the corner of the graphical user interface, which may serve aesthetic, functional, or informational purposes. In an embodiment, the illustration 200a-b includes data visualization tools 210. As used in this disclosure, "data visualization tools" are features or components within the graphical user interface that transform raw data into graphical formats. In a non-limiting example, data visualization tools 210 may include charts, graphs, heatmaps, or overlays, enabling users to analyze and interpret information effectively. In an embodiment, illustration 200a-b may include a frame 212. In some embodiments frame 212 may include an ROI or a bounding box as described throughout this disclosure. In some embodiments, user may adjust frame 212 using the GUI. In an embodiment, the frame may be a boundary or window within the graphical user interface that defines a specific area of interest, allowing users to isolate and interact with that region for detailed analysis, annotation, or rescanning. In an embodiment, the illustration 200a-b includes interactive elements 214. As used in this disclosure, "interactive elements" are graphical components within the graphical user interface. Interactive elements 214 may include as buttons, sliders, or icons, that respond to user actions, enabling interaction with the system to perform tasks or manipulate data. In an embodiment, interactive elements may include buttons labeled "Discard Changes," "Apply," and "Revert," which may enable users to manage modifications to the displayed slide data. Additionally, features such as "Add Point," "Color," and "Clear All" may allow for dynamic annotation and editing of visual elements on the slide. Other interactive elements 214 may include graphical elements such as limits or bounding boxes for identified areas may also be toggled using controls like "Hide Limits" and "Hide Boxes." In another embodiment, interactive elements 214 may feature tools such as "Fit View." In an embodiment, illustration 200a-b may include a current status window 216. As used in this disclosure, a "current status window" is a graphical section within the interface that displays real-time information or metrics related to the system's operations. In an embodiment, current status window 216 may include processing status, errors, or quality parameters. In an embodiment, illustration 200a-b may include an event selection window 218. As used in this disclosure, an "event selection window" is a section of the graphical user interface that allows users to choose, filter, or manage events, such as actions, notifications, or tasks, for further processing or visualization. In an embodiment, illustration 200a-b may include a resource menu 220. As used in this disclosure, a "resource menu" is a navigational component within the graphical user interface that provides access to system resources, tools, or settings, allowing users to manage configurations or access additional functionalities. In an embodiment, illustration 200*a-b* may include a missing tissue menu 222. As used in this disclosure, a "missing tissue menu" is a specific component of the graphical user interface that highlights or lists regions of a slide where tissue is absent, providing options for further action. Without limitation, missing tissue menu 222 may include functions for annotation or rescanning. In an embodiment, illustration 200*a-b* may include a text input window 224. As used in this disclosure, a "text input window" is a graphical section within the user interface that allows users to enter text-based information. In a non-limiting example, text input window 224 may permit the user to provide annotations, search queries, or commands, to interact with or modify the system's operations.

Figure 3:
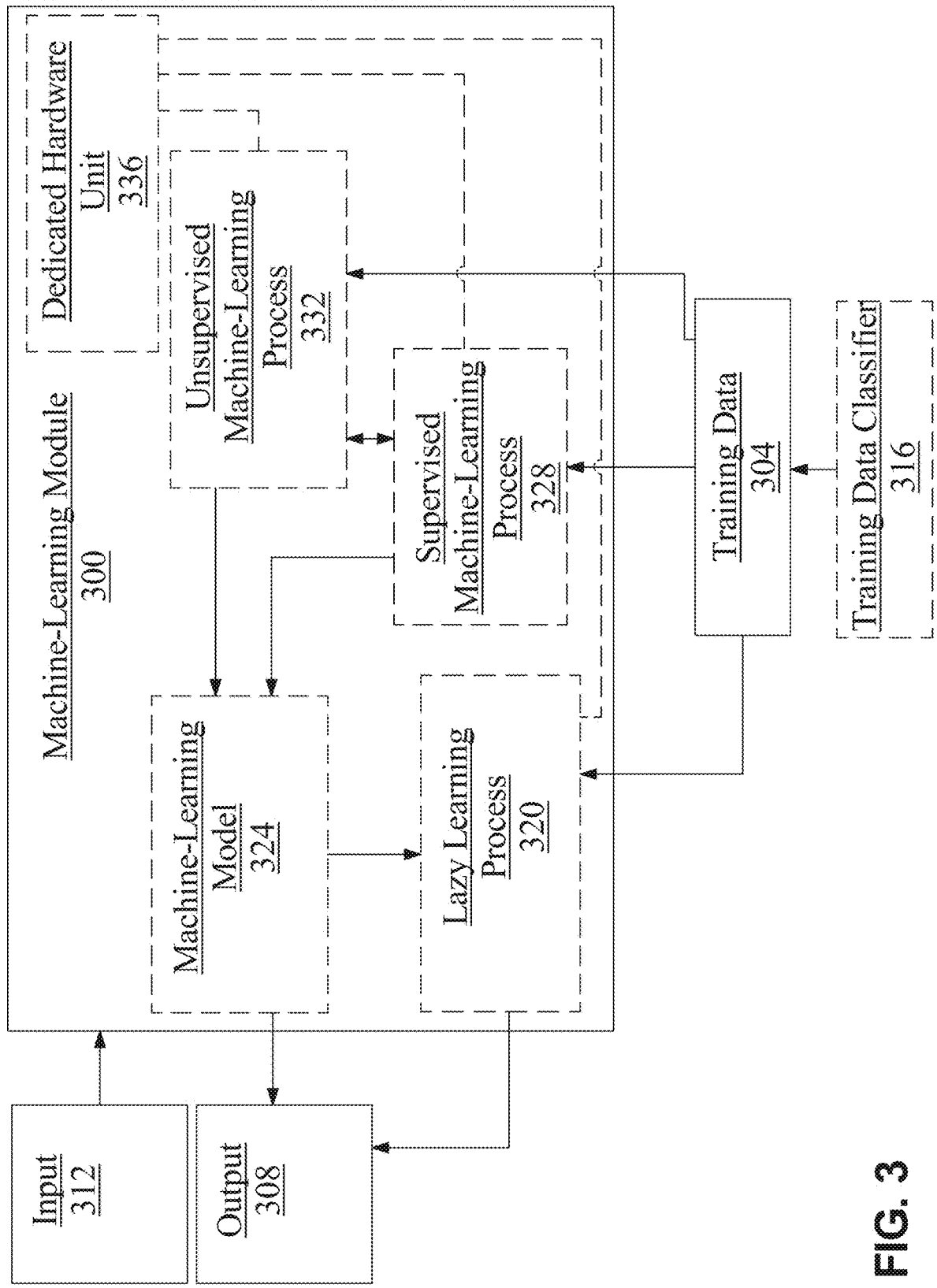
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include scanned image 116, quality metric 126, user input 120, quality threshold 132, ROI 136, and the like. As a non-limiting illustrative example, output data may include quality metric 126, ROI 136, scanner command 150, quality error 130, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a specimen cohort related to a type of specimen, type of experiment, type of research, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include scanned image 116, quality metric 126, user input 120, quality threshold 132, ROI 136, and the like as described above as inputs, quality metric 126, ROI 136, scanner command 150, quality error 130, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
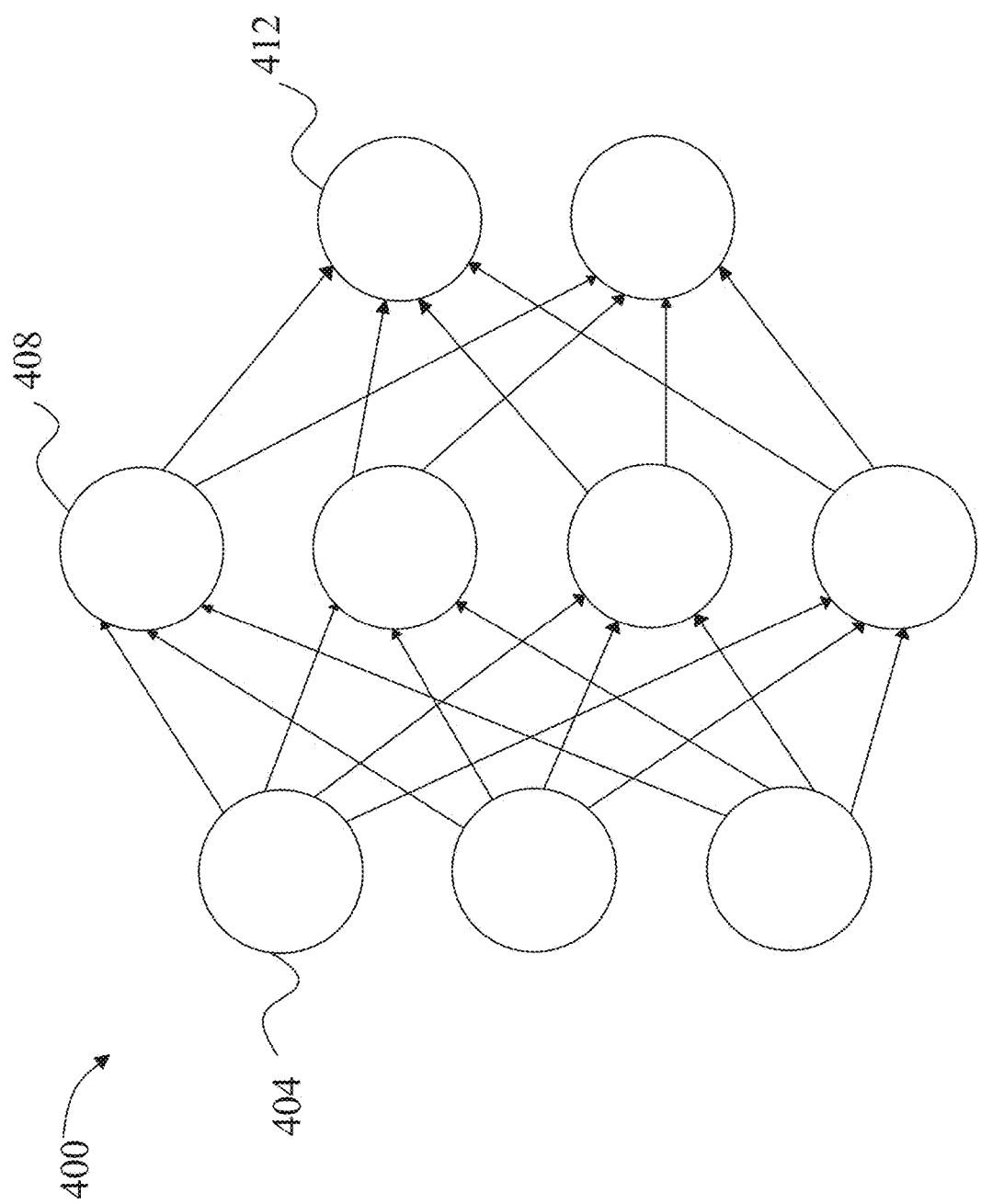
FIG. 4 illustrates a diagram of an exemplary neural network.

Referring now to FIG. 4 an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
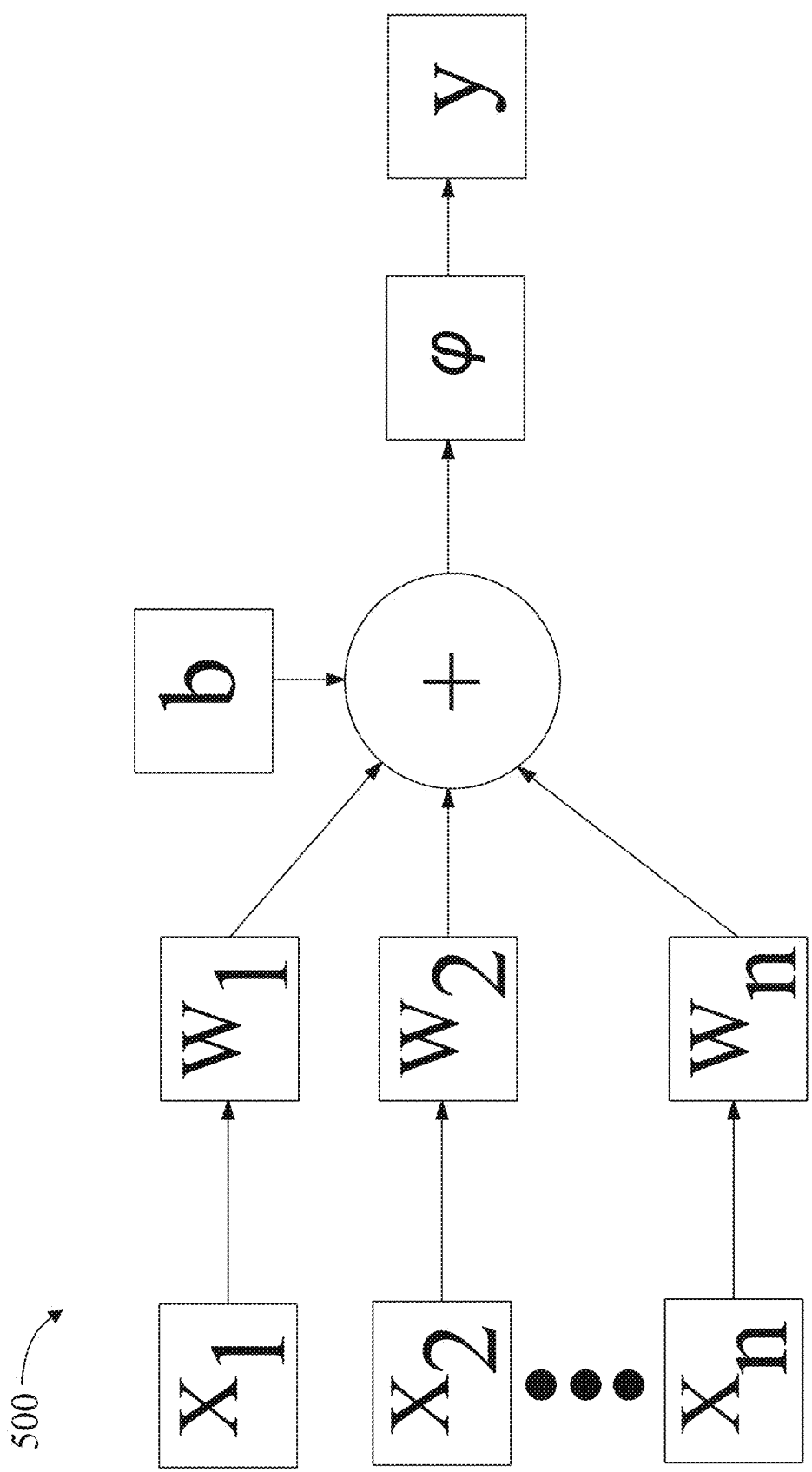
FIG. 5 illustrates a block diagram of an exemplary node in a neural network.

Referring now to FIG. 5 an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_L$ may be determined by training a neural network using training data, which may be performed using any suitable process as described above.

Figure 6:
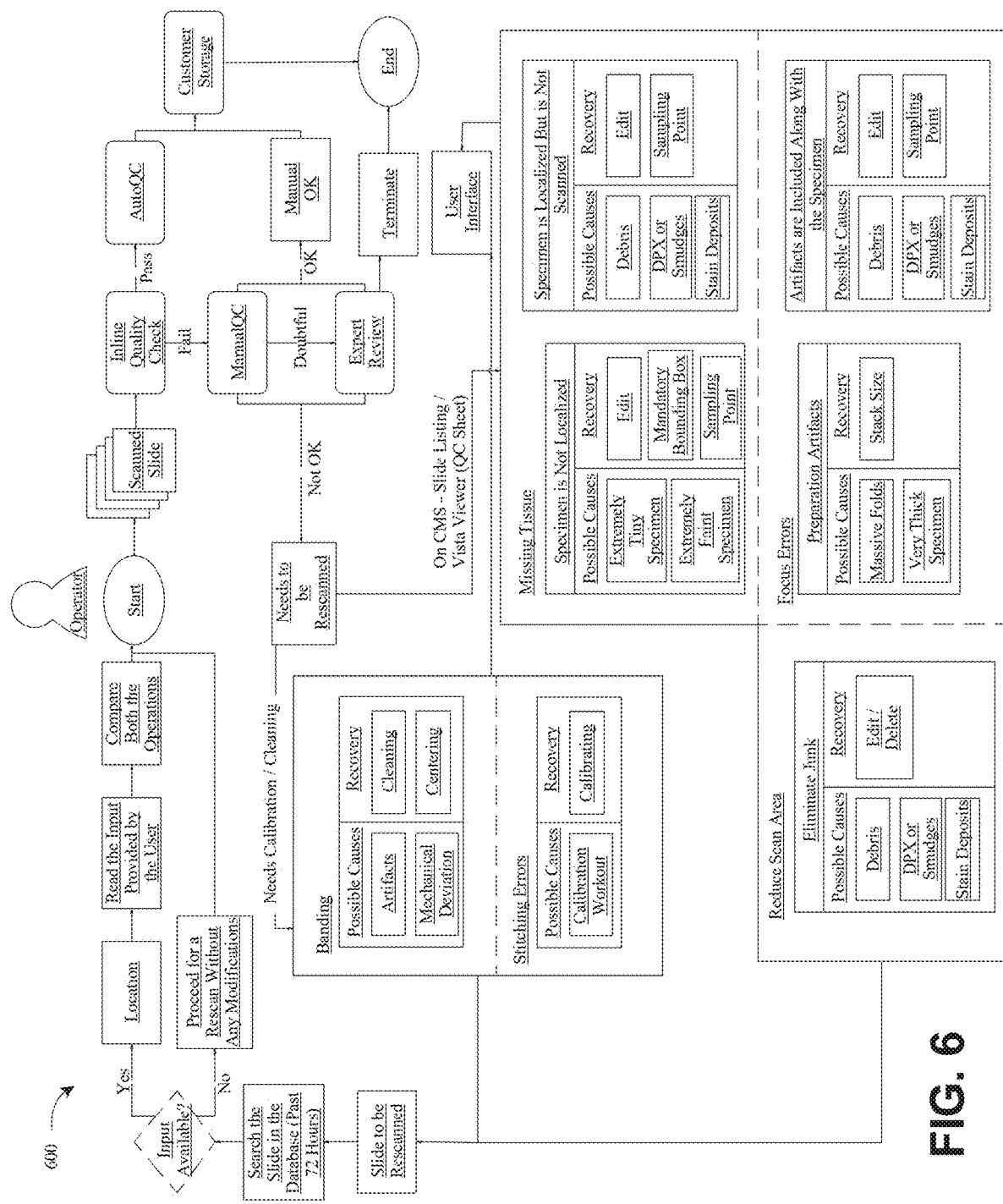
FIG. 6 illustrates a flow diagram of an exemplary apparatus for rescan workflow management in automated scanning systems.

Referring now to FIG. 6, a flow diagram of an exemplary apparatus 600 for rescan workflow management in automated scanning systems. Apparatus 600 disclosed herein may be consistent with apparatus 100 described with respect to FIG. 1. The flow diagram begins with the input of a scanned slide, where apparatus 600 can determine if the slide requires rescanning based on quality metrics or manual inspection. If rescanning is needed, apparatus 600 may evaluate the quality issues using parameters such as banding, missing tissue, stitching errors, focus errors, or excessive scan areas. Each error type may include possible causes and suggested recovery actions. For example, and without limitation, banding errors may arise from artifacts or optical misalignments and can be addressed by system cleaning or parameter adjustments. For example, and without limitation, missing tissue refers to portions of the specimen not being scanned, which may result from improper slide placement or hardware misalignment, with recovery steps involving re-mounting or equipment recalibration. For example, and without limitation, stitching errors, caused by misaligned image segments, may require calibration or re-optimization of stitching software. For example, and without limitation, focus errors, potentially caused by preparation artifacts or system miscalibration, can be corrected by rechecking slide preparation or focusing algorithms. For example, and without limitation, excessive scan areas, where unnecessary regions of the slide are scanned, can be optimized by reducing bounding boxes and excluding irrelevant areas. In some embodiments, each quality error may be visually represented with specific icons, causes, and recovery suggestions. In some embodiments, user or operator may adjust the visual elements. In a non-limiting example, apparatus 600 may include a user interface for manual input and error localization, allowing operators to mark regions of interest and apply corrections interactively. The workflow may include quality validation, either automatically or through a manual check before the final scanned image is stored or released to the customer.

Figure 7:
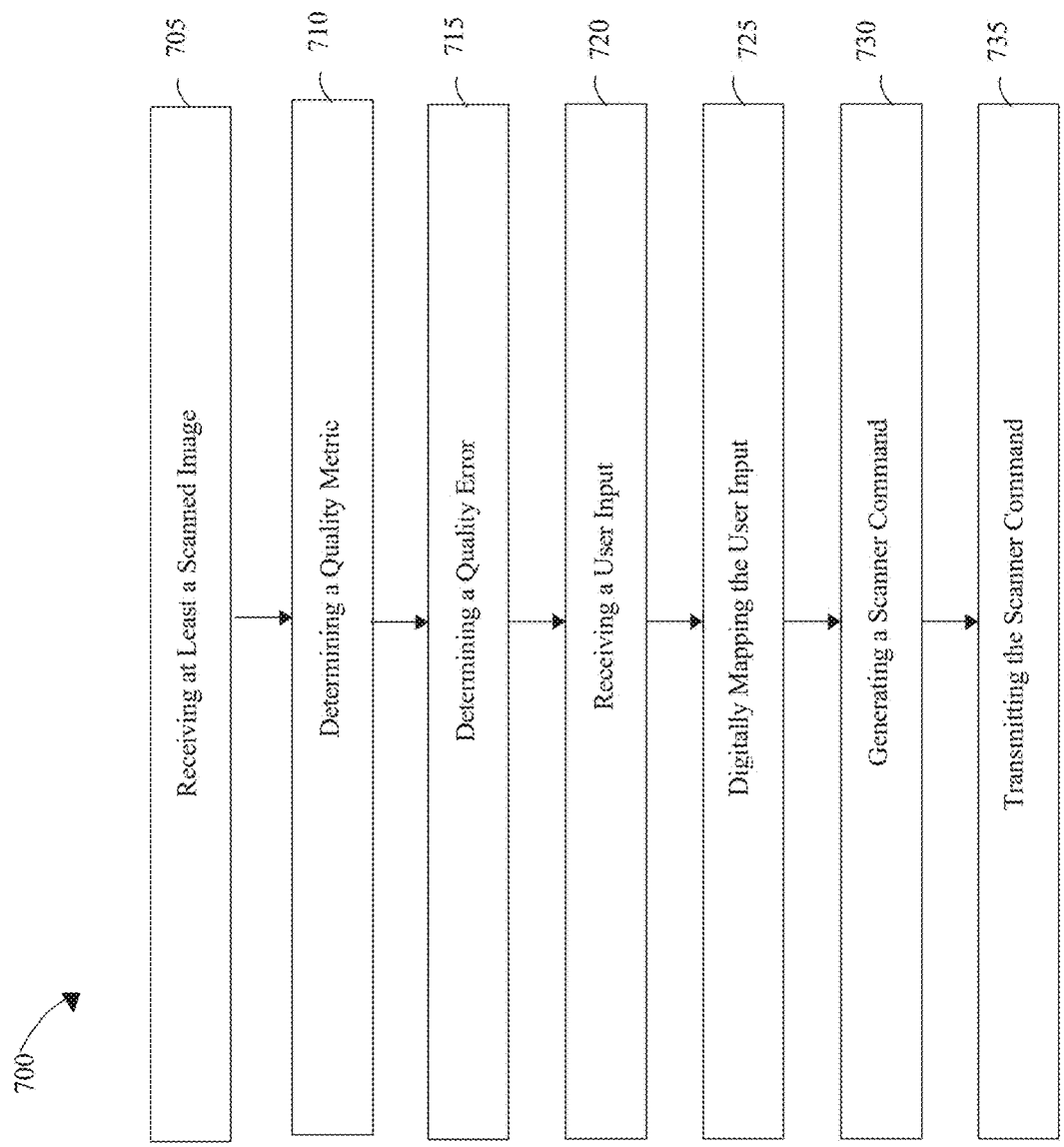
FIG. 7 illustrates a flow diagram of an exemplary method for rescan workflow management in automated scanning systems.

Referring now to FIG. 7, a flow diagram of an exemplary method 700 for rescan workflow management in automated scanning systems is illustrated. Method 700 contains a step 705 of receiving, using at least a processor, at least a scanned image from a scanning system, wherein the scanning system is configured to initiate a scanning operation and a rescanning operation for at least a slide to generate the at least a scanned image. These may be implemented as reference to FIGS. 1-6.

With continued reference to FIG. 7, method 700 contains a step 710 of determining, using at least a processor, a quality metric of at least a scanned image using at least a quality control algorithm. This may be implemented as reference to FIGS. 1-6.

With continued reference to FIG. 7, method 700 contains a step 715 of determining, using at least a processor, a quality error by comparing the quality metric to a quality threshold. In some embodiments, determining the quality error may include generating annotation training data, wherein the annotation training data may include exemplary scanned images correlated to exemplary ROIs with quality errors, training an annotation machine-learning model using the annotation training data, determining the at least a ROI using the trained annotation machine-learning model and determining the quality error as a function of the at least a ROI.

With continued reference to FIG. 7, method 700 contains a step 720 of receiving, using at least a processor, a user input for at least a scanned image as a function of a quality error, wherein the user input includes one or more corrective actions. In some embodiments, the quality error may include a focus error. In some embodiments, the user input may identify the at least a ROI on the at least a scanned image and the one or more corrective actions associated with the at least a ROI. In some embodiments, receiving the user input may include generating a graphical user interface including the at least a ROI, wherein the at least a ROI may be visually indicated within the at least a scanned image using a visual element. In some embodiments, receiving a user input including a modification of the visual element associated with the at least an ROI and determining at least one of the one or more corrective actions as a function of the modification of the visual element. In some embodiments, receiving the user input may include generating a graphical user interface comprising the at least a scanned image as a function of the quality metric and the quality threshold. In some embodiments, receiving the user input may include updating the quality threshold as a function of the user input. These may be implemented as reference to FIGS. 1-6.

With continued reference to FIG. 7, method 700 contains a step 725 of digitally mapping, using at least a processor, a user input to at least a corresponding region on at least a slide. In some embodiments, digitally mapping the user input to the at least a corresponding region on the at least a slide may include extracting a unique identifier from the at least a scanned image and associating the user input to the at least a slide as a function of the unique identifier. These may be implemented as reference to FIGS. 1-6.

With continued reference to FIG. 7, method 700 contains a step 730 of generating, using at least a processor, a scanner command as a function of at least a corresponding region, wherein the scanner command is configured to command the scanning system to prioritize the at least a corresponding region when rescanning the at least a slide. In some embodiments, generating the scanner command may include determining one or more rescanning parameters for the rescanning operation the at least a slide as a function of the user input and the quality metric and generating the scanner command as a function of the one or more rescanning parameters. In some embodiments, the scanner command may be further configured to command at least one scanner of a plurality of scanners of the scanning system to rescan the at least a slide as a function of the one or more rescanning parameters. These may be implemented as reference to FIGS. 1-6.

With continued reference to FIG. 7, method 700 contains a step 735 of transmitting, using at least a processor, a scanner command to a scanning system. This may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
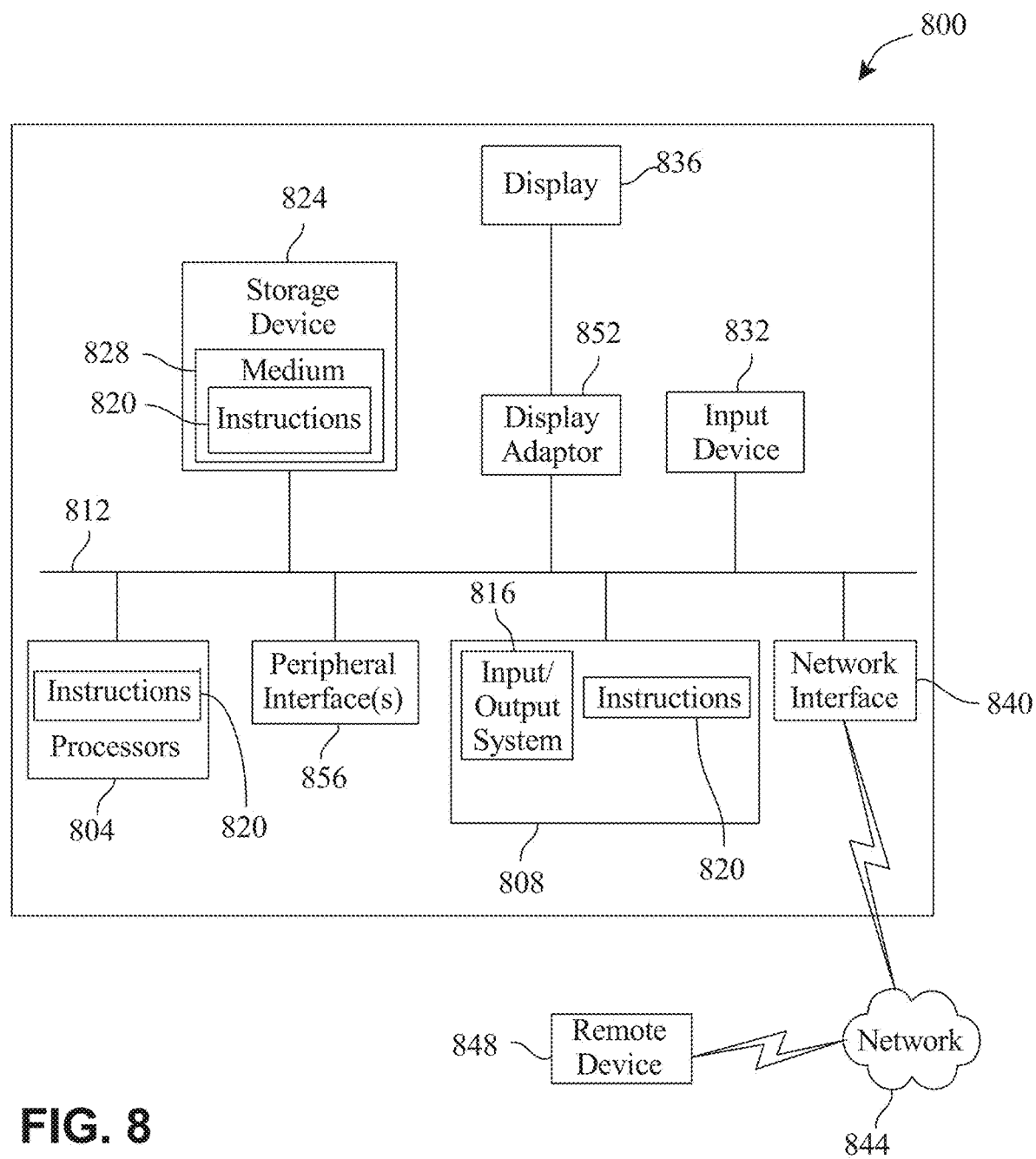
FIG. 8 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for rescan workflow management in automated scanning systems, the apparatus comprising:
    a scanning system, wherein the scanning system is configured to initiate a scanning operation and a rescanning operation for at least a slide to generate at least a scanned image;
    at least a processor; and
    a memory communicatively connected to the at least a processor, wherein the memory contains instructions configuring the at least a processor to:
    receive the at least a scanned image;
    determine a quality metric of the at least a scanned image using at least a quality control algorithm;
    determine a quality error by comparing the quality metric to a quality threshold;
    receive, as a function of determining the quality error, a user input for the at least a scanned image, wherein the user input comprises one or more corrective actions;
    digitally map the user input to at least a corresponding region on the at least a slide;
    generate a scanner command as a function of the at least a corresponding region, wherein the scanner command is configured to command the scanning system to prioritize the at least a corresponding region when rescanning the at least a slide; and
    transmit the scanner command to the scanning system.

2. The apparatus of claim 1, wherein the quality error comprises a focus error.

3. The apparatus of claim 1, wherein generating the scanner command comprises:
    determining one or more rescanning parameters for the rescanning operation the at least a slide as a function of the user input and the quality metric; and
    generating the scanner command as a function of the one or more rescanning parameters.

4. The apparatus of claim 3, wherein the scanner command is further configured to command at least one scanner of a plurality of scanners of the scanning system to rescan the at least a slide as a function of the one or more rescanning parameters.

5. The apparatus of claim 1, wherein determining the quality metric of the at least a scanned image comprises:
    generating annotation training data, wherein the annotation training data comprises exemplary scanned images correlated to exemplary ROIs with quality errors;
    training an annotation machine-learning model using the annotation training data;
    determining at least a region of interest (ROI) using the trained annotation machine-learning model; and
    determining the quality error as a function of the at least a ROI.

6. The apparatus of claim 5, wherein receiving the user input comprises generating a graphical user interface comprising the at least an ROI, wherein the at least an ROI is visually indicated within the at least a scanned image using a visual element.

7. The apparatus of claim 6, wherein receiving the user input comprises:
    receiving a user input comprising a modification of the visual element associated with the at least an ROI; and
    determining at least one of the one or more corrective actions as a function of the modification of the visual element.

8. The apparatus of claim 1, wherein receiving the user input comprises generating a graphical user interface comprising the at least a scanned image as a function of the quality metric and the quality threshold.

9. The apparatus of claim 1, wherein receiving the user input comprises updating the quality threshold as a function of the user input.

10. The apparatus of claim 1, wherein digitally mapping the user input to the at least a corresponding region on the at least a slide comprises:
    extracting a unique identifier from the at least a scanned image; and
    associating the user input to the at least a slide as a function of the unique identifier.

11. A method for rescan workflow management in automated scanning systems, the method comprising:
    receiving, using at least a processor, at least a scanned image from a scanning system, wherein the scanning system is configured to initiate a scanning operation and a rescanning operation for at least a slide to generate the at least a scanned image;
    determining, using the at least a processor, a quality metric of the at least a scanned image using at least a quality control algorithm;
    determining, using the at least a processor, a quality error by comparing the quality metric to a quality threshold;
    receiving, using the at least a processor, a user input for the at least a scanned image as a function of determining the quality error, wherein the user input comprises one or more corrective actions;
    digitally mapping, using the at least a processor, the user input to at least a corresponding region on the at least a slide;
    generating, using the at least a processor, a scanner command as a function of the at least a corresponding region, wherein the scanner command is configured to command the scanning system to prioritize the at least a corresponding region when rescanning the at least a slide; and
    transmitting, using the at least a processor, the scanner command to the scanning system.

12. The method of claim 11, wherein the quality error comprises a focus error.

13. The method of claim 11, wherein generating the scanner command comprises:
    determining one or more rescanning parameters for the rescanning operation the at least a slide as a function of the user input and the quality metric; and
    generating the scanner command as a function of the one or more rescanning parameters.

14. The method of claim 13, wherein the scanner command is further configured to command at least one scanner of a plurality of scanners of the scanning system to rescan the at least a slide as a function of the one or more rescanning parameters.

15. The method of claim 11, wherein determining the quality error comprises:
    generating annotation training data, wherein the annotation training data comprises exemplary scanned images correlated to exemplary ROIs with quality errors;
    training an annotation machine-learning model using the annotation training data;
    determining at least a region of interest (ROI) using the trained annotation machine-learning model; and
    determining the quality error as a function of the at least a ROI.

16. The method of claim 15, wherein receiving the user input comprises generating a graphical user interface comprising the at least a ROI, wherein the at least a ROI is visually indicated within the at least a scanned image using a visual element.

17. The method of claim 16, wherein receiving the user input comprises:
    receiving a user input comprising a modification of the visual element associated with the at least an ROI; and
    determining at least one of the one or more corrective actions as a function of the modification of the visual element.

18. The method of claim 11, wherein receiving the user input comprises generating a graphical user interface comprising the at least a scanned image as a function of the quality metric and the quality threshold.

19. The method of claim 11, wherein receiving the user input comprises updating the quality threshold as a function of the user input.

20. The method of claim 11, wherein digitally mapping the user input to the at least a corresponding region on the at least a slide comprises:
    extracting a unique identifier from the at least a scanned image; and
    associating the user input to the at least a slide as a function of the unique identifier.

* * * * *